United States Patent

Bell

[15] 3,659,362

[45] May 2, 1972

[54] IMPLEMENT HITCH
[72] Inventor: Charles Gilbert Bell, Sioux City, Iowa
[73] Assignee: City of Sioux City, Iowa
[22] Filed: May 14, 1970
[21] Appl. No.: 37,261

[52] U.S. Cl. ............................37/42 R, 172/275, 172/276, 280/481
[51] Int. Cl. .........................................A01b 51/00
[58] Field of Search ................280/481, 479, 509; 37/42

[56] References Cited

UNITED STATES PATENTS

| | | | |
|---|---|---|---|
| 3,233,350 | 2/1966 | Malzahn et al. | 280/481 UX |
| 3,432,184 | 3/1969 | Tweedy | 280/479 |
| 2,710,464 | 6/1955 | Husting | 37/42 |
| 3,074,501 | 1/1963 | Lane | 180/14 |

Primary Examiner—Leo Friaglia
Attorney—Roylance, Abrams, Kruger, Berdo and Kaul

[57] ABSTRACT

A hitch for implements of the pushed type including first and second plates, one mounted on a truck and the other on the implement. The plates are aligned and held together by a peg which protrudes from one plate and through a tube attached to the other. A latch lever holds the peg in the tube. Guide blocks on one plate mate with notches on the other to limit relative rotation of the plates. A hydraulic or pneumatic cylinder operates between the hitch and the truck to move the hitch about pivots by which the hitch is connected to the truck.

6 Claims, 7 Drawing Figures

PATENTED MAY 2 1972
3,659,362
SHEET 1 OF 2
FIG. 1
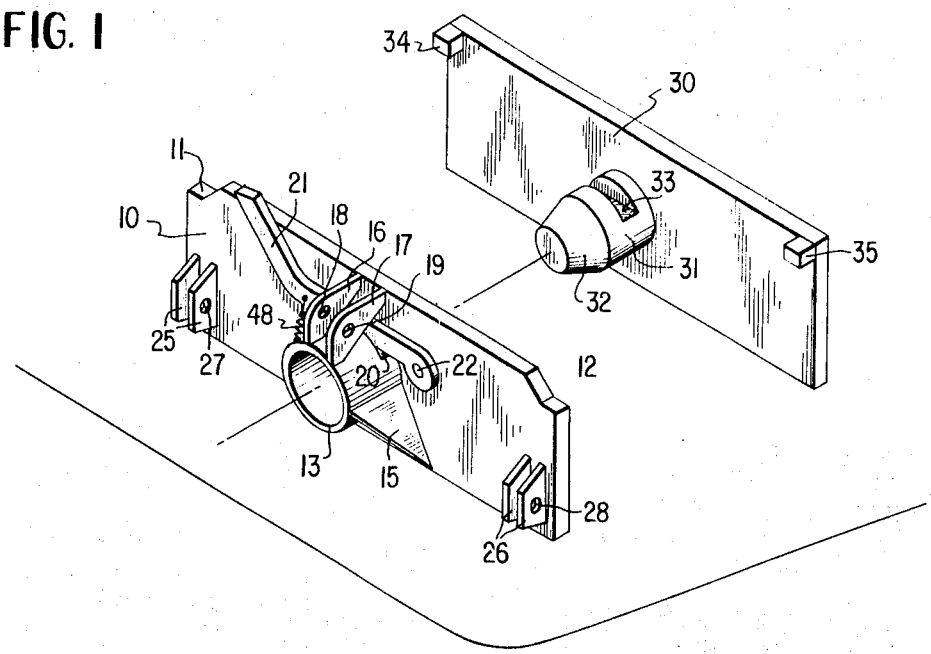
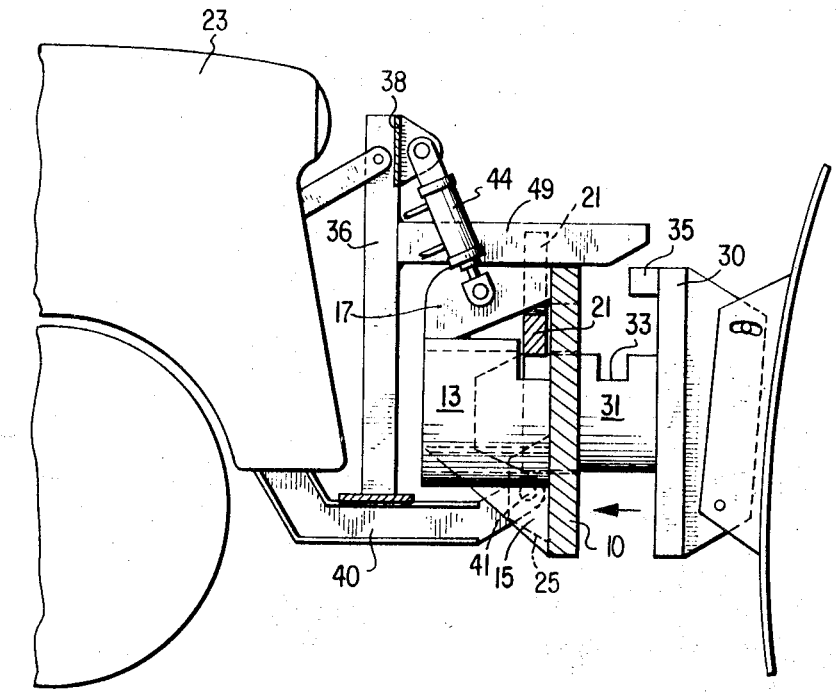
FIG. 2
INVENTOR
CHARLES GILBERT BELL
BY Raylance, Abrams, Kruger, Burdo & Koul
ATTORNEYS PATENTED MAY 2 1972 3,659,362
SHEET 2 OF 2
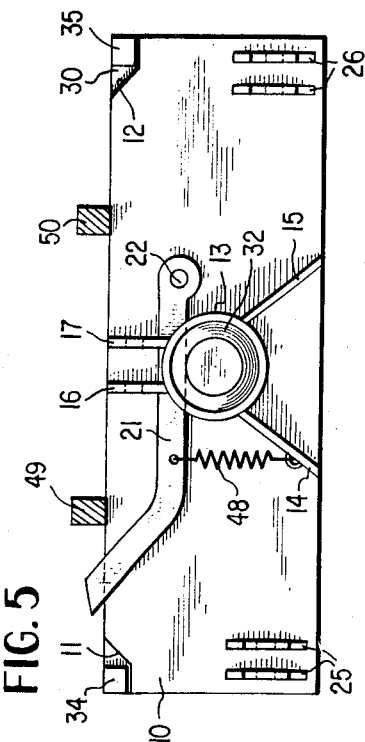
FIG. 5
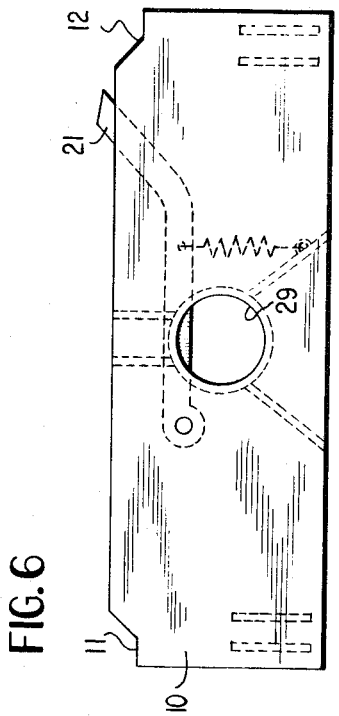
FIG. 6
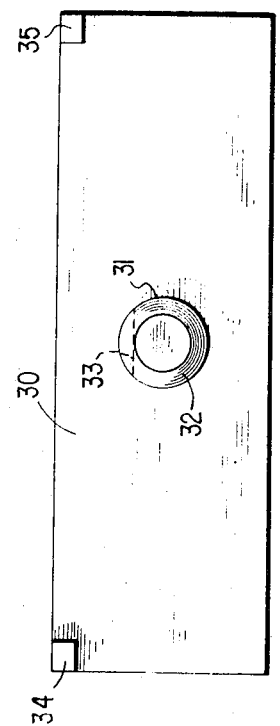
FIG. 7
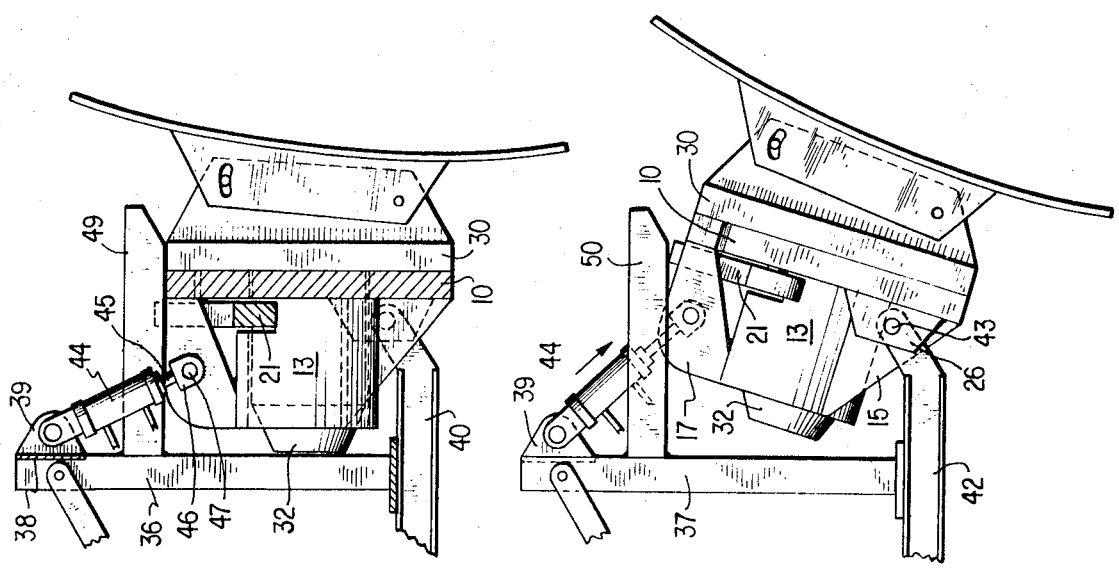
FIG. 3
FIG. 4
INVENTOR
CHARLES GILBERT BELL
BY Roylance, Abrams, Kruger, Berdo & Kaul
ATTORNEYS

IMPLEMENT HITCH

This invention relates to an implement hitch, and more specifically to means for coupling a work implement to a propelling vehicle such as a truck, preferably at the front of the vehicle, and in a manner which permits the implement to be readily disconnected from the truck.

It is a principal object of the present invention to provide an implement hitch for connecting a snow plow, broom or the like to the front of a truck by a device which is structurally strong and can withstand the stresses to which such tools are subjected. It is a further object to provide a device which can be easily and quickly decoupled to release the implement from the truck. A further object is to provide a hitch wherein the portion of the hitch to be attached to the work implement is extremely simple and inexpensive with the moving parts being attached to the portion of the hitch which is, generally, permanently attached to the truck so that a large number of tools can be provided permanently with the simpler portion of the hitch at relatively small expense.

Broadly described, the invention includes two plates, one attached to the vehicle and the other attached to an implement. Means for holding the plates in parallel, contiguous relationship when the hitch is fully engaged in its coupled condition includes a peg which protrudes from one plate, extends through the other into a cylindrical socket member, and is held therein by a latch. With no more structure, the plates could rotate relative to each other about the axis of the peg. Causing the peg to be noncircular is possible, but places considerable torsional stress thereon, an undesirable characteristic. Accordingly, guide blocks are provided on one plate which protrude across the edges of the other plate, or into notches in the other plate, these guide blocks acting against the edges of the other plate to limit or, if desired, to prevent such rotational motion. The plate which is attached to the vehicle is advantageously connected for pivotal movement about an axis parallel to the plates, the movement being controlled by an hydraulic or pneumatic cylinder connected between the vehicle and a portion of the coupling spaced from the pivot axis. Thus, the structure can be raised or lowered.

In order that the manner in which the foregoing and other objects are obtained in accordance with the invention can be understood in detail, particularly advantageous embodiments thereof will be described with reference to the accompanying drawings, which form a part of this specification, and wherein:

FIG. 1 is a perspective view of the two portions of a hitch in accordance with the present invention;

FIG. 2 is a side elevation in partial section showing the two portions of the hitch in partial engagement;

FIG. 3 is a side elevation in partial section showing the two portions of the hitch in full engagement;

FIG. 4 is a side elevation of the assembled hitch in a lowered position;

FIG. 5 is a rear elevation of the hitch of the present invention;

FIG. 6 is a front elevation of the portion of the hitch normally attached to a propelling vehicle;

FIG. 7 is a rear elevation of the portion of the hitch which is normally attached to a propelled implement.

Referring now to the drawings, FIG. 1 shows a perspective view of the two portions of the hitch, not connected to either a vehicle or a tool, as they might be just prior to the coupling or engagement operation. It will be recognized that either portion of the hitch could be attached to the truck, the other being attached to the implement. However, in most circumstances it would be desirable to have the simplest structure attached to the implement. Hence, it will be assumed that the left-hand portion of the hitch is attached to a propelling vehicle and the right-hand portion to a plow or the like.

The vehicle carried portion includes a plate 10 which is preferably made of steel and which is thick and rigid in construction. It is substantially rectangular in shape but has notches 11 and 12 cut from its upper corners. At the center of plate 10 a cylindrical tube 13 is firmly attached as by welding or the like. Braces 14 and 15 are welded to the outer surface of tube 13 and to plate 10 to support the tube in a position in which its axis is perpendicular to the plane in which the plate lies. Brackets 16 and 17 are attached to the upper portion of the outer surface of tube 13 and also to plate 10. Brackets 16 and 17 serve to further support the tube in its desired position, and also are provided with openings 18 and 19 to which drive means can be connected to pivot the plate.

The upper portion of tube 13 adjacent plate 10 is cut out in the form of a transverse recess 20 which extends completely through the upper wall of the tube. A latch lever 21 is pivotally attached to plate 10 by a pin 22. The lower portions of brackets 16 and 17 are cut away in the region near recess 20 to permit the latch lever to extend transversely across tube 13 and to lie in the recess. Lever 21 is rotatable clockwise, as viewed in FIGS. 1 and 5, so that the lower surface of the latch lever emerges completely form the interior of tube 13.

Pairs of hinge brackets 25 and 26 are securely attached, as by welding, to the back of plate 10. Brackets 25 and 26 are provided with openings 27 and 28 to receive axles about which the plate can be pivotally moved.

The other portion of the hitch includes a plate 30 of generally rectangular shape and of construction similar to plate 10. Plate 30 is provided with a thick cylindrical peg 31 which is attached to the center of plate 30 as by welding or the like. Peg 31 terminates in a frusto-conical end 32, the major diameter of the peg being slightly smaller than the inner diameter of tube 13. A transverse notch or recess 33 is provided in the upper portion of peg 31. Notch 33 is spaced from, or extends from, plate 30 for a distance equal to the thickness of plate 10 plus the width of lever 21 so that when the peg enters tube 13 the recess in the peg aligns with recess 20 in tube 13 to permit the latch to enter recess 33.

Plate 30 is also provided with guide blocks 34 and 35 welded to the upper corners of the plate on the same surface from which the peg protrudes. Guide blocks 34 and 35 are dimensioned and located to mate with notches 11 and 12.

FIGS. 2 and 3 show the hitch in side elevation and in partial section, FIG. 2 illustrating the apparatus in partly assembled form and FIG. 3 showing the structure completely engaged. These figures also show the bracing members which connect plate 10 and the structure carried thereby to a propelling vehicle such as truck 23. A rigid frame or brace 40 extends from the frame of truck 23 forwardly to plate 10, brace 40 being provided with a transverse axle 41 which extends through opening 27 in hinge bracket 25. A similar frame or brace 42 not visible in FIGS. 2 and 3, but visible in FIG. 4, extends forwardly at the other end of plate 10 and is provided with an axle 43 which extends through the brace and through opening 27 in hinge bracket 25. Plate 10 is supported by axles 41 and 43 and is freely pivotable about those axles.

A pair of upstanding brace members 36 and 37 are mounted on braces 40 and 42, respectively, and extend vertically beyond the upper limits of the hitch. A transverse brace 38 extends between the upper ends of braces 36 and 37 and supports a bracket 39 to which the upper end of a pneumatic or hydraulic cylinder 44 is connected. Cylinder 44 contains a piston which is connected to a connecting rod 45. Rod 45 terminates in a link 46 which extends between brackets 16 and 17 and is pivotally connected thereto by a pin 47. When fluid pressure is applied to the piston, the piston is moved in cylinder 44, plate 10 and the structure connected thereto is pivoted about axles 41 and 43 to lower or raise the implement, as shown in FIG. 4.

Guide members 49 and 50 extend forwardly from upstanding braces 36 and 37, respectively, and contact the upper edge of plate 30 when it is in its upper or raised position. These guide members prevent the entire apparatus from tending to rotate.

As will be seen in FIGS. 2 and 3, in the process of assembling the apparatus to couple the implement to the truck, peg 31 is inserted through the hole 29 in plate 10. The frusto-conical surface 32 of peg 31 presses latch level 29 upwardly by a camming action so that peg 31 can pass into the interior of tube 13. The peg is pushed into the tube until recess 33 is aligned with recess 20, permitting latch 21 to fall into recess 33, thus retaining the peg within the tube.

It should be observed that latch 21 is subjected to relatively little stress because of the fact that the present hitch is designed especially for use with implements which are to be pushed rather than pulled. In the fully engaged position, the coupling involves substantially continuous contact of the adjacent surfaces of plates 10 and 30 which face each other so that a relatively large area absorbs the stress. Peg 31 is subjected to some torsional stress as the plow tends to deviate to one side or the other, and is therefore made relatively thick. However, its primary function is alignment and the peg therefore does not absorb excessive energy.

In order to separate the two portions, it is necessary only to lift the distal end of lever 21 and then separate the two plates. When the lever is lifted far enough to clear the upper edges of recess 33, the implement halves can be disengaged easily.

It will be recognized that plates 10 and 30 might have a tendency to rotate relative to each other around the axis of peg 31. To limit such motion, guide blocks 35 and 35 are provided and engage notches 11 and 12, one block preventing angular motion in one direction and the other block preventing motion in the opposite direction. Clearly, if it is desired to permit some relative angular motion between the plates, the notches and blocks need only be dimensioned to leave a gap therebetween. This has the desirable effect of allowing a plow to follow the contours of an uneven surface by engaging in some angular motion, but of limiting the motion within desired limits.

In FIG. 5 the relationship of notches 11 and 12 and guide blocks 34 and 35 can be more clearly seen. Also, the relationship between latch lever 21 and tube 12 can be seen, the lower surface of lever 21 being shown in the latched position wherein the arm is in recesses 20 and 33. It will be observed that a tension coil spring 48 is connected between lever 21 and brace 14 to continually urge the lever toward its most counterclockwise position.

FIG. 6 shows a front view of the structure shown in FIG. 5 with the portion of the hitch including plate 30 removed. It will be seen that lever 21 extends across hole 29 in plate 10 and the opening in tube 13.

In FIG. 7 is shown a front elevation of the portion of the hitch which is attached to the implement showing the relative dispositions of the guide blocks and of peg 31.

While one advantageous embodiment has been chosen to illustrate the invention, it will be understood by those skilled in the art that various changes and modifications can be made therein without departing from the scope of the invention as defined in the appended claims.

What is claimed is:
1. A hitch for releasably interconnecting a propelling vehicle and a work implement comprising
a first flat, thick rigid plate;
a second flat, thick rigid plate;
means for securing one of said plates to the propelling vehicle;
means for securing the other of said plates to a work implement;
means for limiting relative angular motion between said plates about an axis perpendicular to said plates;
means for holding said plates in parallel, contiguous, contacting relationship when the hitch is in a fully engaged condition,
said means for holding said plates in contacting relationship comprising
a cylindrical peg protruding from said first plate in the direction of said second plate, said peg being substantially greater in length than the thickness of said second plate, said peg having a radially inwardly extending recess;
a latch arm pivotally mounted on said second plate on the side opposite that which contacts said first plate;
spring means for urging said latch arm into said recess in said peg when said hitch is in the fully engaged position; and
a hollow cylindrical housing mounted on said second plate adjacent said latch arm, said housing being dimensioned to receive said peg, said housing having an opening therein to permit said latch to engage said recess in said peg,
said second plate having an opening therein to permit said peg to pass through and enter said housing.

2. An apparatus according to claim 1 wherein said means for securing one of said plates to the propelling vehicle further comprises
a pair of blocks mounted above said one of said plates and firmly attached to the frame of the vehicle for contacting said one of said plates at at least one position and for limiting motion thereof in a plane perpendicular to the axis of said peg.

3. A hitch for releasably interconnecting a propelling vehicle and a work implement comprising
a first flat, thick rigid plate;
a second flat, thick rigid plate;
means for securing one of said plates to the propelling vehicle;
means for securing the other of said plates to a work implement;
means for holding said plates in parallel, contiguous, contacting relationship when the hitch is in a fully engaged condition; and
means for limiting relative angular motion between said plates about an axis perpendicular to said plates comprising
guide blocks on one of said plates for contacting peripheral surfaces of the other of said plates.

4. A hitch for releasably interconnecting a propelling vehicle and a work implement comprising
a first flat, thick rigid plate;
a second flat, thick rigid plate;
means for securing the other of said plates to a work implement;
means for holding said plates in parallel, contiguous, contacting relationship when the hitch is in a fully engaged condition;
means for limiting relative angular motion between said plates about an axis perpendicular to said plates;
means for securing one of said plates to the propelling vehicle comprising
means for pivotally mounting one side of said one of said plates to the frame of the vehicle; and
fluid pressure operated means for moving the opposite side of said one of said plates to tilt the assembly about an axis perpendicular to the axis of said peg.

5. A hitch for releasably interconnecting a propelling vehicle and a work implement comprising the combination of
a substantially rectangular first plate;
a substantially rectangular second plate of substantially the same size and shape as said first plate;
one of said first and second plates having
a section of cylindrical hollow tube fixedly attached to the center of the plate with the axis of said tube perpendicular to said plate, said tube having a transverse slot extending through one side thereof near said plate;
a latch lever pivotally mounted on said plate and extending parallel thereto, said latch lever being movable into said slot;
a central circular opening aligned with, and of the same diameter as, the interior of said tube; and
spring means for urging said lever into said slot;
the other of said first and second plates having
a peg protruding from the center thereof, said peg being of a diameter to pass through said central opening and into said tube, said peg having a transverse slot positioned to align with the transverse slot in said tube when said peg is inserted therein;

one of said first and second plates further having
   guide blocks fixedly mounted adjacent two corners thereof; and
the other of said first and second plates having
   two notched corners to receive said guide blocks;
means for mounting one of said first and second plates on a propelling vehicle; and
a work implement mounted on the other of said plates.

6. A hitch according to claim 5 wherein said means for mounting comprises
hinge blocks attached to said plate;
axle means extending through said hinge blocks for supporting said plate;
means for attaching said axle means to said vehicle; and
hydraulic means connected between said plate and the propelling vehicle for pivoting said plate about said axle.

* * * * *